United States Patent [19]
Fliesser et al.

[11] 3,824,605
[45] July 16, 1974

[54] ILLUMINATION CONTROL ARRANGEMENT FOR PHOTOGRAPHIC CAMERA

[75] Inventors: Engelbert Fliesser; Karel Pustka; Eduard Wagensonner, all of Munich, Germany

[73] Assignee: Agfa-Gevaert Aktiengesellschaft, Leverkusen, Germany

[22] Filed: Nov. 13, 1973

[21] Appl. No.: 415,387

Related U.S. Application Data
[62] Division of Ser. No. 176,757, Oct. 6, 1971.

[30] Foreign Application Priority Data
Oct. 6, 1970 Germany............................ 2049110

[52] U.S. Cl..................... 354/42, 352/141, 354/44, 354/271
[51] Int. Cl. ............................................ G03b 7/10
[58] Field of Search........... 95/10 C, 10 CD, 10 CE, 95/64 D; 352/141

[56] References Cited
UNITED STATES PATENTS
2,683,402  7/1954  Bruck............................ 95/10 CD
3,120,161  2/1964  Pickens et al.................... 95/10 CD
3,455,227  7/1969  Sato et al. ...................... 95/10 CD Primary Examiner—Joseph F. Peters, Jr.
Attorney, Agent, or Firm—Michael S. Striker

[57] ABSTRACT

An arrangement in photographic cameras in which the diaphragm is positioned through an electromagnetically operated setting device with damped motion. A first voltage divider has a light-sensitive element and is connected to one terminal of a difference amplifier. A second voltag divider is connected to the second terminal of the difference amplifier and serves as a source of reference voltage against which the voltage signals from the first voltage divider containing the light-sensitive element is compared. The output of the difference amplifier is connected to the diaphragm-setting device which, in turn, positions a voltage generator that provides a voltage signal dependent upon the velocity of the diaphragm-setting device. This velocity-dependent voltage signal is applied to the second voltage divider so as to result in damped motion of the setting device.

9 Claims, 3 Drawing Figures

ILLUMINATION CONTROL ARRANGEMENT FOR PHOTOGRAPHIC CAMERA

This is a division, of application Ser. No. 176,757 filed Oct. 6, 1971.

BACKGROUND OF THE INVENTION

The present invention relates to an illumination control arrangement for a photographic camera having an electromagnetic drive mechanism for setting the diaphragm opening. A control circuit is, furthermore, provided for driving the mechanism for setting the diaphragm.

Cameras of the preceding species as known in the art, have the disadvantage that the illumination impinging upon the film of the cameras is not always precisely controlled. This results from the condition that the movable elements in the camera, including the driving mechanism, can oscillate about the final position to which the mechanism is to be set. Such oscillations occur as a result of the inertia properties of the mechanical moving elements. In one camera known in the art, the attempt is made to remove this disadvantage by providing a damping coil or winding in addition to the driving coil or winding, and having this damping winding function as a tacho generator or rate generator for the purpose of damping the control circuit. The present invention is designed, however, to remove the preceding disadvantages in a camera without having to resort to an additional damping winding, and to accomplish this method through simple means.

This is achieved, in accordance with the present invention, by providing a first light-sensitive receiver with a voltage divider connected to a comparator voltage divider which is, in turn, connected to an input of a difference amplifier. The output circuit of this difference amplifier is connected to the winding of a driving mechanism which generates a regulating voltage dependent upon the velocity of the mechanism. This velocity-dependent voltage is applied, through an amplifier, to the comparator voltage divider. If a predetermined voltage prevails between the input of the difference amplifier, a current flows through the winding of the driving mechanism, which has a predetermined magnitude and which sets the mechanism into motion. Coupled to the driving mechanism, is a diaphragm mounted in front of the light-sensitive receiver. This diaphragm is adjustable through the voltage across the light-sensitive receiver varying as a function of the prevailing light intensity, and appearing across the first voltage divider.

Through means of the driving mechanism, a regulating voltage is produced which is proportional to the velocity or rate of motion of the driving mechanism. At the input of the following amplifier, a voltage appears which has a magnitude identical to the variation of the voltage as a function of time. This input voltage is, thereby, identical to the rise in the voltage-time curve. The greater the driving velocity, the greater is also, thereby, the voltage at the input of the amplifier. This voltage is amplified by the amplifier, and is again applied to the input of the difference amplifier. This feedback coupling becomes superimposed on the partial voltage of the comparator voltage divider. Through this feedback voltage, furthermore, the motion of the driving mechanism becomes damped.

In accordance with a further embodiment, a regulating voltage divider is influenced or adjusted through a positioning arrangement driven by the driving mechanism. This regulating voltage divider is connected to a differentiating network which, in turn, is connected to the amplifier.

In a still further embodiment, the regulating voltage divider consists of a light-sensitive element and a fixed resistor. The light-sensitive element is subjected to light from a lamp which is operated through constant current. Between the lamp and the light-sensitive element is a diaphragm mounted so that it is coupled to the driving mechanism.

In accordance with another advantageous design of the present invention, the regulating voltage divider is in the form of a potentiometer which is positioned by the driving mechanism.

The coil or winding of the driving mechanism is advantageously connected, on the one hand, with the output of the differential amplifier, and, on the other hand, with the junction between two voltage sources. Since the differential amplifier and the amplifier are connected to both of the voltage sources, the voltage divider including the light-sensitive element as well as the comparator voltage divider, are both connected to the junction between the two voltage sources.

The differentiating network consists of a capacitor and a resistor, in the conventional manner.

In accordance with another advantageous embodiment of the present invention the driving coil of the driving mechanism is connected in a branch of a bridge which is balanced when the driving mechanism is stationary or at standstill. The bridge is not balanced when the driving mechanism is in motion and induced voltage prevails within the coil. The bridge circuit is connected to a second difference amplifier.

The output of the first difference amplifier is connected, in an advantageous manner, with a vertex or point of a diagonal of the bridge, and a second point of the bridge or its vertex, is connected to the junction between the two voltage sources.

For setting the regulation precisely, a variable resistor is provided between one input and the output of the differential amplifier.

In order to allow setting of the feedback voltage through the comparator voltage divider in an optimum manner, a variable resistor is provided between the input and the output of the amplifier for the purpose of varying the feedback voltage.

SUMMARY OF THE INVENTION

An object of the present invention is to provide a diaphragm setting arrangement for a photographic camera in which the diaphragm is positioned with damped motion.

It is a further object of the present invention to provide an arrangement as set forth for photographic cameras, which can be economically fabricated and readily maintained.

A still further object of the present invention is to provide a setting arrangement of the foregoing character which may be simply operated.

The objects of the present invention are achieved by providing an illumination control arrangement with adjustable diaphragm positioned through electromagnetically operated setting means in the form of an electrical motor. The position of the motor determines the position for opening of the diaphragm. A first voltage divider has a light-sensitive element in the form of a resistor connected in series with a fixed resistor. This first voltage divider provide an output voltage dependent on the light impinging on the light-sensitive resistor. A second voltage divider serves as a reference voltage source for comparing the voltage output from the first voltage divider. A difference amplifier is connected to the first and second voltage divider and compares the two voltage outputs, so as to drive the diaphragm setting means in accordance with the difference of the two voltage outputs from the two voltage dividers. A regulating voltage generator connected to the diaphragm setting arrangement and the second voltage divider, provides a regulating voltage which is dependent on the velocity of motion of the diaphragm setting means. This regulating voltage is then applied to the second voltage divider to adjust the output voltage from the second voltage divider in accordance with the velocity-dependent signal derived from the voltage generator. The circuit behavior is such that the motion in setting the diaphragm to a desired opening, is a damped motion. The setting mechanism for setting the diaphragm may be in form of a servomotor, a variable induction coil mechanism of a measuring or indicating instrument of the rotary coil type.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
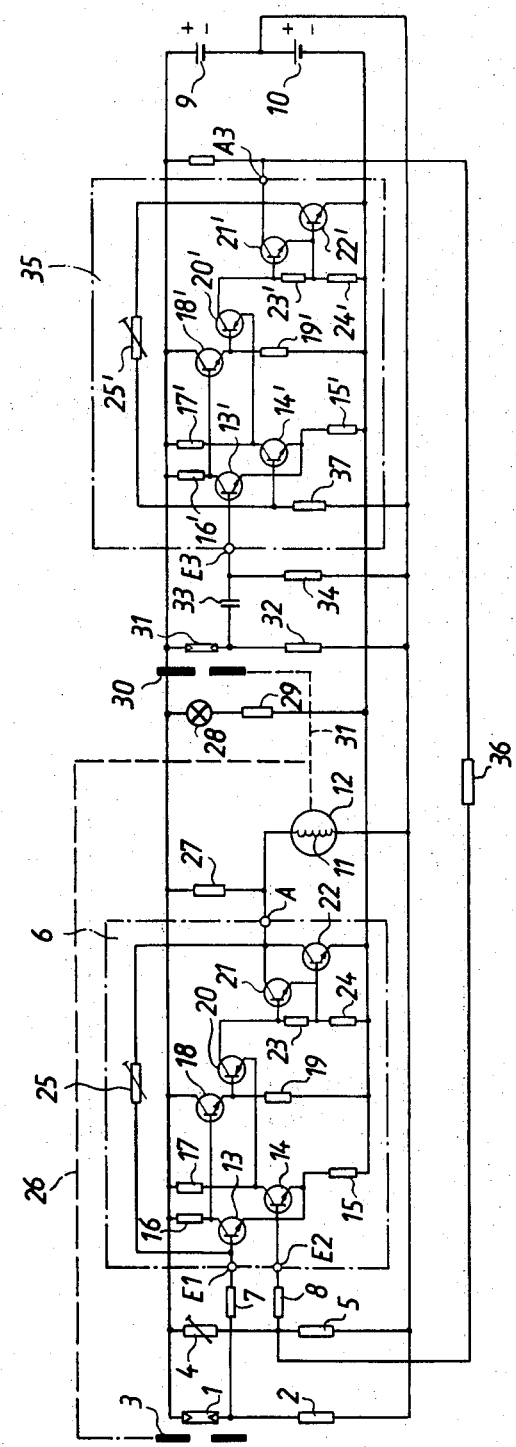
FIG. 1 is an electrical circuit diagram and shows a first embodiment of the present invention for setting a diaphragm in a photographic camera.

Referring to the drawing and in particular to FIG. 1, a photoresistor 1 is connected in series with a fixed resistor 2. A diaphragm or aperture 3 is mounted in front of the photoresistor. Connected in parallel with the photoresistor 1 and the fixed resistor 2, is a comparator voltage divider composed of resistor 4 in the form of a variable resistor, and a fixed resistor 5. A difference or differential amplifier 6 has an input E1, a second input E2, as well as an output A. The input E1 is connected, through a resistor 7, with the tap or junction between the photoresistor 1 and the fixed resistor 2. The input E2, on the other hand, is connected, through a resistor 8, with the tap or junction between the resistors 4 and 5. The difference amplifier 6 is provided with power or electrical energy, through two batteries 9 and 10 connected in series. The junction terminal between the two batteries 9 and 10 is connected, on one hand, to a winding 11 of a driving motor 12, as well as to the two voltage dividers 1, 2 and 4, 5. The winding 11 of the motor 12, furthermore, is connected to the output A of the difference amplifier 6.

The difference amplifier 6 has two resistors 13 and 14 which have their emitters connected to each other. A resistor 15 is connected between the two emitters and one terminal of the battery 10. In the collector circuit of the transistor 13 is a resistor 16, whereas a resistor 17 is provided in the collector circuit of the transistor 14. The base of the transistor 13 is connected with the input E1 of the amplifier, and the base of the transistor 14 is connected with the input E2 of this amplifier. Leading from the collector of the transistor 13, is a connection to the base of a further transistor 18 having a resistor 19 in its emitter circuit. A connection leads from the collector of the transistor 14 to the emitter of a still further transistor 20 having its base connected with the emitter of transistor 18. The collector of the tranistor 20 is connected to a transistor 21. The collector of this transistor leads to the output A of the difference amplifier 6. The collector of the transistor 21 is, furthermore, connected to the collector of a further transistor 22, which has its base connected to the emitter of the transistor 21. A voltage divider is provided with resistors 23 and 24. The output A is, moreover, connected, through a variable resistor 25, to the input E1 of the difference amplifier 6.

The mechanical coupling of the motor 12 with the diaphragm 3, is denoted by the reference numeral 26. A load resistor 27 provided in the collector circuit, has a magnitude such that when the voltage at the input E1 is identical to the voltage at the input E2, the output impedance of the difference amplifier is equal to the magnitude of the resistor 27. In thise case, therefore, in which no voltage difference prevails between the input E1 and the input E2, the voltage at the output A is equal to the voltage prevailing at the junction between the two voltage sources 9 and 10.

A lamp 28 is connected in series with a resistor 29. A diaphragm 30 is mechanically coupled to the coupling 31, with the motor 12. The diaphragm 30 is mounted in front of a photoresistor 31 which is connected in series with a fixed resistor 32. The junction between the two resistors 31 and 32 leads to a capacitor 33 which forms a differentiating network together with a resistor 34.

The junction of the capacitor 33 and the resistor 34 is connected to an input E3 of an amplifier 35. The output A3 of this amplifier 35 is connected, through a resistor 36, with the junction between the two resistors 4 and 5. The amplifier 35 is also connected to the two voltage sources 9 and 10. This amplifier 35 is constructed identically to the difference amplifier 6. The only difference between the two difference amplifiers is that no second input is provided in the amplifier 35. Elements in the amplifier 35 which are identical to the elements used in the difference amplifier 6, are designed with identical reference numerals. However, to distinguish the components in the amplifier 35 from those in the amplifier 6, the components or elements in amplifier 35 have been assigned a "prime" symbol.

A difference from the difference amplifier 6 resides in the feature that the base of the transistor 14' is connected via a resistor 37, to the junction of the voltage sources 9 and 10.

In operation of the arrangement described above, assume that the voltage at the input E1 of the difference amplifier 6 is identical to the voltage at the input E2.

As a result, the voltage at the output A is equal to the voltage prevailing between the two batteries 9 and 10 at the junction thereof. With this prevailing circuitry, no current flows through the coil 11 of the motor 12. The diaphragm in front of the objective opening or aperture is thereby set to the correct position. The diaphragm 30 in front of the photoresistor 31, furthermore, has a predetermined opening. Since no variations in the diaphragm opening 30 occur which are dependent on time so that there are no velocity-connected variations in this diaphragm opening, no voltage appears at the input E3 of the amplifier 35. Thus, since there is no rate of change in the opening, there is no voltage at the input E3. As a result, the voltage at the output A3 of the amplifier 35, is identical to the voltage at the junction between the two voltage sources 9 and 10. The feedback voltage from the amplifier 35 is thereby zero.

If lighting or illumination conditions prevail which are different from those described above, and if the voltage at the input E1 is, thereby, larger or smaller than the voltage at the input E2 of the amplifier 6, then a voltage appears at the output A, which is greater or smaller than the voltage at the junction between the two voltage sources 9 and 10. As a result, the coil 11 of the motor 12 becomes energized with current which flows in one or the other opposite direction. Through the rotation of the motor 12, the diaphragm 3 as well as the diaphragm 30 becomes driven so that their openings or apertures become larger or smaller.

The photoresistor 31 has light applied to it through the lamp 28 which emits light with uniform intensity. At the junction between the photoresistor 31 and the fixed resistor 32, is a voltage which varies as a function of the rate of change of the opening of the diaphragm 30. This voltage becomes differentiated through the differentiating network 33, 34, so that the input E3 of the amplifier 35 is subjected to a voltage signal which corresponds to the rate of change of the increase or decrease in voltage at the junction between the photoresistor 31 and the fixed resistor 32. This voltage signal then becomes amplified through the amplifier 35, and is transmitted to the input E2 of the difference amplifier 6. This feedback voltage is superimposed on the partial voltage derived from the voltage divider 4, 5. The feedback voltage operates in the sense of decreasing the voltage between the two inputs E1 and E2. When the setting of the diaphragm 3 approaches that corresponding to a predetermined brightness or illumination which prevails, the current through the coil 11 of the motor 12 becomes reduced and the motor thereby rotates in a slower manner. As a result, the voltage at the input E3 of the amplifier 35 also becomes smaller, since the rate of change of decrease in the partial voltage at the voltage divider 31, 32 becomes smaller. The feedback voltage also thereby decreases. When, now, the voltage between the two inputs E1 and E2 of the difference amplifier 6 becomes zero, no current flows further through the coil 11 of the motor 12. The diaphragm is then set to the correct position, and the setting procedure for the diaphragm takes place with damped motion.

Figure 2:
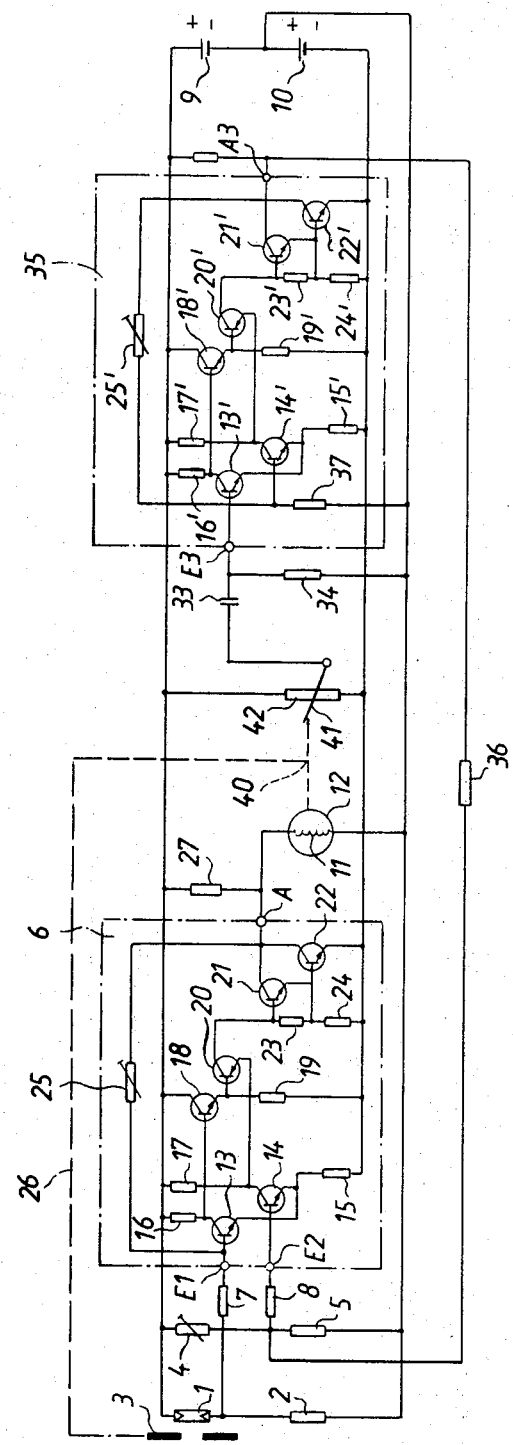
FIG. 2 is an electrical circuit diagram of a second embodiment of the arrangement of FIG. 1.

The embodiment of FIG. 2 is similar to that of FIG. 1. Individual elements or components in FIG. 2 which are identical or correspond to those in FIG. 1, are designated with identical reference numerals. A difference between the embodiments of FIG. 2 from that of FIG. 1 is the feature that a potentiometer 42 is positioned through a mechanical coupling 40 with the motor 12. The coupling 40 positions the sliding contact 41 of the potentiometer. This sliding contact 41 is, furthermore, electrically connected to a capacitor 33 of the differentiating network 33, 34.

The functional operation of this embodiment in FIG. 2 is similar to that of FIG. 1. The sliding contact 41 of the potentiometer is positioned in dependence on the velocity of the motor 12, and as a result, a voltage signal varying with time appears at the input of the capacitor 33. This time dependent voltage signal becomes differentiated through the differentiating network 33, 34, so that a voltage which is proportional to velocity, appears at the input E3 of the amplifier 35.

Figure 3:
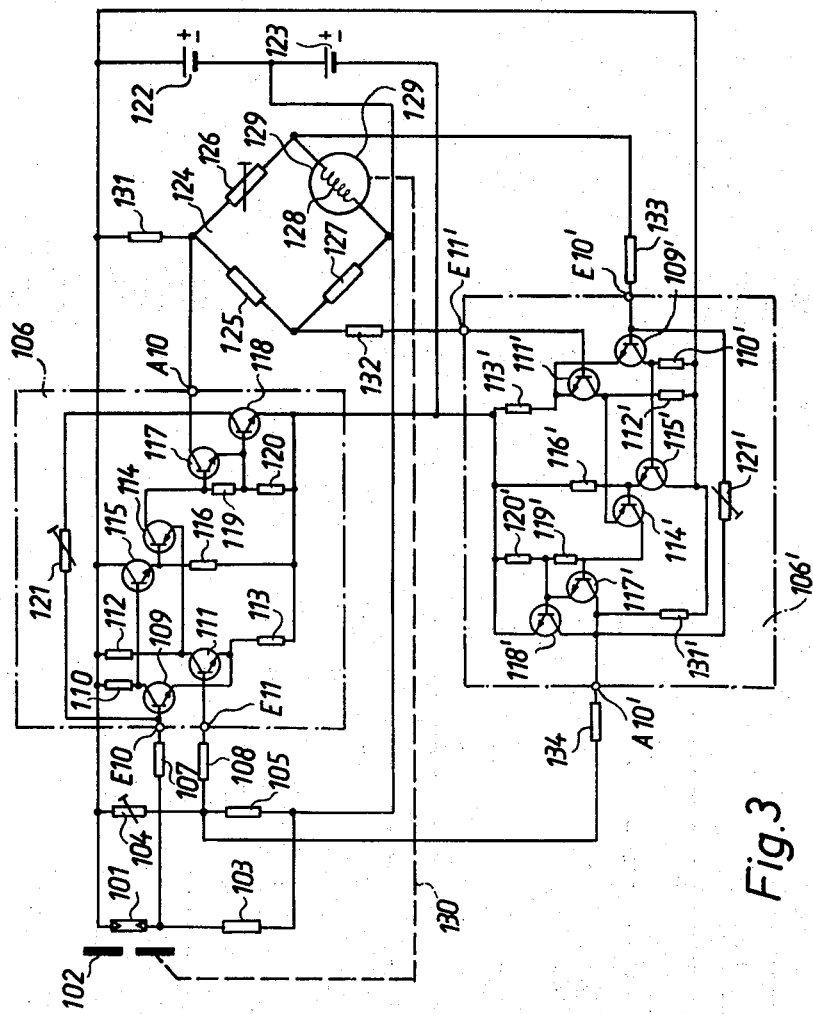
FIG. 3 is an electrical circuit diagram and shows a third embodiment of the arrangement of FIG. 1 in accordance with the present invention.

In accordance with the third embodiment shown in FIG. 3, a photoresistor 101 is mounted in front of a diaphragm 102. A fixed resistor 103 is connected in series with the photoresistor 101. Connected in parallel with the voltage divider consisting of the photoresistor 101 and the resistor 103, is a comparator voltage divider consisting of an adjustable resistor 104 and a fixed resistor 105.

A first difference amplifier 106 has two inputs E10 and E11, and an output designated as A10. The junction between the two resistors 101 and 103 is connected, through a resistor 107, to the input E10, and the junction between the two resistors 104 and 105 leads, through a resistor 108, to the input E11.

The difference amplifier 106 is constructed similar to the difference amplifier of FIGS. 1 and 2.

Connected in parallel with the difference amplifier 106, are two voltage sources 122 and 123.

A bridge circuit 124 is provided between the output A10 of the difference amplifier 106, and a junction between the two voltage sources 122 and 123. Within this bridge circuit, are branches containing resistors 125, 126, 127 as well as the coil 128 of a driving motor 129.

The motor 129 is mechanically coupled to the diaphragm 102, through a mechanical coupling 130. The objective diaphragm is, furthermore, positioned by the motor 129, in a manner not shown.

A load resistor 131 is provided in the collector circuit of the transistor 117 of the difference amplifier 106. The magnitude of this load resistor 131 corresponds to the resistance of the bridge circuit 124. The voltage drop across the resistor 131, is equal to the voltage of the source 122, when the bridge circuit is balanced.

A second difference amplifier 106' has identical elements as the first difference amplifier 106. The elements or components in the difference amplifier 106' are thereby provided with identical reference numerals to correspond to their identical counterparts in the amplifier 106.

The two remaining diagonal points or vertices of the bridge circuit 124 are connected with the two inputs E10' and E11' of the difference amplifier 106'. In the two connecting branches are provided resistors 132 and 133. The output A10' of the difference amplifier 106' is connected, through a resistor 134, with the junction between the two resistors 104 and 105.

The two voltage sources 122 and 123 are connected to the difference amplifier 106 as well as with the second difference amplifier 106'.

The bridge circuit 124 is balanced when the motor 129 is at standstill. The resistors 125 and 127 are identical in magnitude. Similarly the resistance value of the resistor 126 corresponds in ohmic value of the coil 128 of the motor 129.

In operation of the preceding arrangement, the diaphragm 102 is positioned, for a predetermined brightness or illumination, so that the voltage between the two inputs E10 and E11 of the difference amplifier 106 becomes zero. As a result, the voltage between the output A10 of the difference amplifier 106, and the junction between the two voltage sources 122 and 123, is also zero. The coil 128 of the motor 129 is thereby not energized with current. The voltage between the two inputs E10' and E11' of the difference amplifier 106', is also zero. In this manner, the voltage between the output A10 and the junction between the two voltage sources 122, 123, is also zero.

If, now, the brightness or illumination conditions become different from those which prevailed previously, a predetermined voltage appears between the input E10 and E11 of the difference amplifier 106. This difference voltage appears amplified at the output A10. Depending upon whether it has become darker or brighter, a voltage appears at the output A10 which is larger or smaller than the voltage prevailing at the junction between the two voltage sources 123 and 122. As a result, the coil 128 is subjected to current in one direction or the opposite direction, and the motor 129 is rotated in the corresponding direction determined by the direction of the current. With the rotation of the motor, the diaphragm 102 is positioned to a larger or smaller opening.

The induced counter-EMF of the motor, a voltage appears between the inputs E10' and E11' of the difference amplifier 106', which corresponds proportionally to the rotational speed of the motor. After amplification, this voltage signal which is proportional to the motor speed, is applied to the input E11 of the difference amplifier 106. This feedback coupling operates in the sense that it decreases the voltage between the inputs E10 and E11. As a result, the voltage at the output A10 decreases, so that the current through the winding or coil 128 also decreases. The induced voltage within the winding 128 is thereby also reduced as a result of the slower rotation of the motor 129. The closer the setting of the diaphragm opening approaches the desired setting or set value, the slower the motion of the motor 129, as it approaches the desired setting. Consequently, the diaphragm opening to be set to correspond correctly to the prevailing lighting conditions, becomes set in a continuous manner which results in a slower motion as the correctly set position is approached. This setting motion of the diaphragm is, thereby, comparable to a damped motion.

It will be understood that each of the elements described above, or two or more together, may also find a useful application in other types of illumination control arrangements for photographic cameras different from the types described above.

While the invention has been illustrated and described as embodied in an illumination control arrangement for photographic cameras, it is not intended to be limited to the details shown, since various modifications and structural and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An illumination control arrangement for a photographic camera having an adjustable diaphragm, comprising, in combination, electromagnetic moving means for setting the size of the opening of said diaphragm; difference amplifier means having first and second inputs and having an output connected to said electromagnetic moving means and operative for varying the energization of said moving means in dependence upon the difference in the voltages applied to said first and second inputs; first voltage divider means including a light-sensitive element positioned to receive light passing through said diaphragm and operative for applying to said first input a first voltage having a magnitude dependent upon the amount of light passing through said diaphragm and impinging upon said light-sensitive element; second voltage divider means operative for applying to said second input of said difference amplifier means a reference voltage; and velocity feedback damping means connected to said moving means and connected to said second voltage divider means and operative for varying the magnitude of said reference voltage by applying to said second voltage divider means a feedback voltage having a magnitude which varies in proportion to the speed of movement of said moving means, said velocity feedback damping means including a potentiometer having a wiper mechanically coupled to said moving means, and differentiator means having an input connected to said wiper of said potentiometer and having an output connected to said second voltage divider means.

2. An arrangement as defined in claim 1, wherein said feedback damping means further includes an amplifier having an input connected to the output of said differentiator and having an output connected to said second voltage divider means.

3. An arrangement as defined in claim 1, including two voltage sources connected in series, said first and second voltage divider means and said difference amplifier means being connected across the series combination of said two voltage sources, and wherein said difference amplifier means comprises a difference amplifier circuit stage having an output terminal, and wherein said electromagnetic moving means is connected between said output terminal of said difference amplifier circuit stage and the junction between said two voltage sources.

4. An arrangement as defined in claim 1, wherein said differentiator means comprises a resistor-capacitor differentiator circuit stage.

5. An arrangement as defined in claim 1, wherein said difference amplifier means includes a variable resistor connected between said output of said difference amplifier means and one of said inputs thereof.

6. An arrangement as defined in claim 1, wherein said moving means comprises a moving-coil arrangement.

7. An arrangement as defined in claim 1, wherein said moving means comprises a servo motor.

8. An arrangement as defined in claim 1, wherein said moving means comprises variable induction coil drive means.

9. An illumination control arrangement for a photographic camera having an adjustable diaphragm, comprising, in combination, electromagnetic moving means for setting the size of the opening of said diaphragm; difference amplifier means having first and second inputs and having an output connected to said electromagnetic moving means and operative for varying the energization of said moving means in dependence upon the difference in the voltages applied to said first and second inputs; first voltage divider means including a light-sensitive element positioned to receive light passing through said diaphragm and operative for applying to said first input a first voltage having a magnitude dependent upon the amount of light passing through said diaphragm and impinging upon said light-sensitive element; second voltage divider means operative for applying to said second input of said difference amplifier means a reference voltage; and velocity feedback damping means connected to said moving means and connected to said second voltage divider means and operative for varying the magnitude of said reference voltage by applying to said second voltage divider means a feedback voltage having a magnitude which varies in proportion to the speed of movement of said moving means, said velocity feedback damping means including a potentiometer having a wiper mechanically coupled to said moving means, a resistor-capacitor differentiating circuit having an input connected to said wiper of said potentiometer and having an output, and an amplifier having an input connected to said output of said resistor-capacitor differentiating circuit and having an output connected to said second voltage divider means for applying thereto said feedback voltage.

* * * * *